United States Patent Office 3,223,690
Patented Dec. 14, 1965

3,223,690
POLYMERIZATION CATALYST FOR ALPHA OLEFINS CONSISTING OF A GROUP VIIb COMPOUND, A GROUP IIIa OR Va METAL HALIDE COMPOUND AND AN ORGANO METAL COMPOUND
Rudolph S. Wilsher, Westfield, Erik Tornqvist, Roselle, and Merrill Lynn, Elizabeth, N.J., assignors to Esso Research and Engineering Company, a corporation of Delaware
No Drawing. Filed Dec. 26, 1962, Ser. No. 247,282
16 Claims. (Cl. 260—93.5)

This invention relates to novel polymerization catalysts, their methods of preparation and their use in the polymerization and copolymerization of alpha olefins.

Prior to the present invention, it was found that alpha olefins such as ethylene, propylene, butylene, isobutylene, and the like could be polymerized and copolymerized in the presence of various combinations of reducing metals or metal compounds, e.g. alkali and alkaline earth metals, their hydrides and alloys; aluminum hydrides, aluminum alkyls, alkyl aluminum halides, and the like in combination with various reducible heavy metal compounds such as the halides, acetyl acetonates, and the like of the metals of Group IV through VI and Group VIII of the Periodic System, e.g. of titanium, zirconium, vanadium, chromium, molybdenum and iron. See, e.g. Belgian Patent #533,362, "Chemical & Engineering News," April 8, 1957, pages 12 through 16 and "Petroleum Refiner," December 1956, pages 191 through 196.

It has now been found that compounds of Group VII–$b$ metals and compounds of Group III–$a$ or V–$a$ may be intensely mixed so as to provide a cocrystalline solid. The resultant cocrystalline solid, when contacted with an organometal compound, affords a novel, highly active polymerization catalyst which is capable of polymerizing and copolymerizing a wide spectrum of alpha olefins to form solid polymers of high crystallinity.

The polymerization catalyst of this invention comprises two components: as a first component, a cocrystalline solid formed by intensely mixing a Group VII–$b$ metallic compound with a Group III–$a$ or V–$a$ compound; as a second component, an organometal compound of Groups I–$a$, II–$a$, II–$b$ or III–$a$. The Periodic System employed in describing this invention is that which appears in "Merck Index," Merck & Co., Inc., Rahway, N.J., Seventh edition (1960).

The first portion of the first component comprises an inorganic metallic compound wherein the cationic moiety is a metal of Group VII–$b$ of the Periodic System and the anionic moiety is an element of Group VI–$a$ of the Periodic System. Preferably the first portion of the first component is an oxide or sulfide of manganese or rhenium such as $MnO_2$, $Mn_2O_3$, $Mn_3O_4$, $MnO_7$, $MnS_2$, $ReO_2$, $ReO_3$, $ReO_4$, $Re_2O_7$, $ReS_2$, $Re_2S_7$, and the like. Particularly preferred herein is $MnO_2$.

The second portion of the first component comprises a compound having the general formula of $Mo_cX_d$, wherein M is a metal of Groups III–$a$ or V–$a$ of the Periodic System, e.g. B, Al, Ga, In, P, Sb, and the like; O is oxygen, $c$ is an integer of zero to one inclusive, X is a halogen with an atomic number of at least 17, i.e. the halogen may be either chlorine, bromine or iodine, $d$ is an integer of one to five inclusive, and the sum of $c$ and $d$ is equal to the valence of the metal M. Suitable examples include $BCl_3$, $BBr_3$, $BI_3$, $AlCl_3$, $AlBr_3$, $AlI_3$, $GaCl_3$, $GaBr_3$, $GaI_3$, $InCl_3$, $InBr_3$, $InI_3$, $PCl_3$, $POCl_3$, $PCl_5$, $PBr_3$, $POBr_3$, $PBr_5$, $PI_3$, $SbCl_3$, $SbOCl_3$, $SbCl_5$, $SbBr_3$, $SbI_3$, and the like. Particularly preferred herein are $AlCl_3$, $AlBr_3$, $PCl_3$, $POCl_3$ and $PCl_5$.

The second component of the catalyst of this invention comprises an organometal compound having the general formula $R_nM'X_y$, wherein R is a monovalent hydrocarbon radical, M' is a metal of Groups I–$a$, II–$a$, II–$b$ or III–$a$ of the Periodic System, e.g. Na, Li, Be, Mg, Ca, Sr, Ba, Zn, Cd, Al, Ga, In, Tl and the like, X is a halogen with an atomic number of at least 17, i.e. X may be chlorine, bromine or iodine, $n$ is an integer of one to three inclusive, $y$ is an integer of zero to two inclusive, and the sum of $n$ and $y$ is equal to the valence of the metal M'.

R, in the general formula above, may be the same or different (i.e. when $n$ is greater than one) monovalent hydrocarbon radicals. Examples of suitable R groups include aryl radicals, aliphatic hydrocarbon radicals or derivatives, such as alkyl, cycloalkyl-alkyl, cycloalkenyl-alkyl, aryl-alkyl, cycloalkyl, aryl-cycloalkyl, cycloalkyl alkenyl, alkyl-aryl or cycloalkyl-aryl radicals.

Specific examples of R groups for substitution in the above formula include methyl, ethyl, n-propyl, isopropyl, n-butyl, isobutyl, n-amyl, isoamyl, n-hexyl, n-octyl, n-decyl, and the like; 2-butenyl, 2-methyl-2-butenyl and the like; cyclopentyl-methyl, cyclohexyl-ethyl, cyclopentyl-ethyl, methylcyclopentyl-ethyl, 4-cyclohexenylethyl, and the like; 2-phenylethyl, 2-phenylpropyl, α-naphthylethyl, methylnaphthylethyl, and the like; cyclopentyl, cyclohexyl, 2,2,1-bicycloheptyl, and the like; methylcyclopentyl, dimethylcyclopentyl, ethylcyclopentyl, methylcyclohexyl, dimethylcyclohexyl, ethylcyclohexyl, isopropylcyclohexyl, 5-cyclopentadienyl, and the like; phenlcyclopentyl, phenylcyclohexyl, the corresponding naphthyl derivatives of cycloalkyl groups, and the like; phenyl, tolyl, xylyl, ethylphenyl, naphthyl, methylnaphthyl, dimethylnaphthyl, ethylnaphthyl, cyclohexylphenyl and the like.

Specific examples of the second component include $(C_6H_5)_3CNa$, n-$C_3H_7Li$, n-$C_4H_9Li$, $(CH_3)_2Be$, $(C_2H_5)_2Be$, $(C_3H_7)_2Be$, $(C_2H_5)_2Mg$, $(C_4H_9)_2Mg$, $(C_6H_5)_2Mg$, $(C_2H_5)_2Ca$, $(C_2H_5)_2Sr$, $(C_2H_5)_2Ba$, $(C_2H_5)_2Zn$, $C_2H_5ZnCl$, $(C_4H_9)_2Zn$, $(C_6H_5)_2Zn$, $(C_2H_5)(C_3H_7)Zn$, $(C_2H_5)(C_4H_9)Zn$, $(C_2H_5)_2Cd$, $(C_2H_5)_3Al$, $(C_2H_5)_2AlCl$, $C_2H_5AlCl_2$, $(C_2H_5)_3Al_2Cl_3$, $(CH_3)_2AlH$, $(CH_3)_3Ga$, $(C_6H_5)_3Ga$, $CH_3)_3In$, $(C_2H_5)_3Tl$, and the like.

Particularly valuable as second components are the lower alkyl aluminum compounds, especially trialkyl aluminum compounds, especially trialkyl aluminum compounds such as triethyl aluminum, tripropyl aluminum, triisobutyl aluminum, and the like, and the lower dialkyl aluminum compounds such as diethyl aluminum halides, e.g. diethyl aluminum chloride, dipropyl aluminum chloride, dissobutyl aluminum chloride, and the like. The lower monoalkyl alkyl aluminum halides, e.g. ethyl aluminum dichloride, can also be used. Additionally organo-aluminum compounds having one or more $C_1$ to $C_8$ hydrocarbon radicals and two or more electron-attracting groups such as alkoxy, organic nitrogen or sulfur groups can also be used. Triethyl aluminum is particularly preferred herein.

In practicing one embodiment of the instant invention, the first component of the polymerization catalyst is prepared by selecting two compounds from the groups described hereinabove and intimately mixing them so as to form a cocrystalline solid.

This intimate mixing may be accomplished by placing the two compounds of the first component together in ball milling, pebble milling, roller milling or corresponding equipment and then milling in an inert atmosphere, such as a nitrogen or argon atmosphere, which is free of oxygen, water vapor, and other catalyst poisons, at a temperature of 0 to 200° C., preferably 15 to 100° C. Hand mixing, e.g. grinding with a mortar and pestle, in an inert atmosphere at a temperature of 0 to 200° C., can also be used to accomplish the intimate mixing. Several grinding media can be advantageously used, but chrome alloy steel balls have been found particularly suitable because of high milling efficiency, good abrasion resistance, ready availability, and low cost. The optimum time period for the dry milling step depends in general upon the efficiency of the equipment used. Ball milling times of from about 1 to 15 days are usually satisfactory. The time period most suitable for any given milling equipment can easily be determined by routine experimentation such as by polymerizations.

The grinding efficiency will, of course, not only depend upon the type of grinding equipment used but also on other factors such as charge and equipment size. For instance, the grinding efficiency will increase with increasing ball mill size so long as optimum grinding conditions are used for each size. The grinding efficiency of ball mills may also be increased by allowing centrifugal force to act upon the balls as is the case in some modern ball milling equipment.

The compounds utilized in preparing the first component of the polymerization catalyst of the instant invention, i.e. the Group VII–$b$ metallic compound and the Group III–$a$ or V–$a$ compound are utilized in a finely divided form, i.e. the compounds have average particle diameters in the 1 to 500 micron range. Particularly preferred are compounds having average particle diameters in the range of 15 to 25 microns. As stated above, the compounds should be free of catalyst poisons and may thus be advantageously dried in vacuo at 50–60° C. and stored under nitrogen prior to their use.

The molar ratio of the Group III–$a$ or V–$a$ compound to the Group VII–$b$ compound is generally in the range of about 0.2:1 to about 4:1, preferably 1:1 to 2:1. Since free halogen may remain adsorbed on the catalyst surface after grinding, it is generally desirable to remove any free halogen by subjecting the cocrystalline solid to vacuum treatment of about 0.01 to 10 mm. Hg at a temperature of 0 to 50° C., preferably at room temperature. The cocrystalline solid may then be advantageously stored under dry nitrogen until its subsequent admixture with the second catalyst component of the instant invention.

The cocrystalline nature of the ball-milled Group VII–$b$—Group III–$a$ or Group VII–$b$—Group V–$a$ catalyst component may be readily demonstrated by high vacuum sublimation. For example, if $MnO_2$ and $AlCl_3$ are ball-milled as described above and then subjected to high vacuum treatment, a minor portion of the $AlCl_3$ is removed from the ball-milled solid. The fact that a major portion of the $AlCl_3$ is not removed is in keeping with the cocrystalline relationship of the $MnO_2$ and $AlCl_3$ in the ball-milled solid. By contrast, when a simple physical mixture (i.e. one which is not ball-milled) of $MnO_2$ and $AlCl_3$ is subjected to high vacuum treatment, substantially all of the $AlCl_3$ is removed. Furthermore, upon X-ray analysis, the cocrystalline solid exhibits a distinctly different pattern from that of the simple physical mixture. Additionally, the catalyst activity of the cocrystalline solid is distinctly different from that of the simple physical mixture.

After preparing the cocrystalline catalyst component as described above, it is admixed with the second catalyst component. The molar ratio of the second catalyst component to the Group VII–$b$ compound of the first component is generally in the range of 0.1:1 to 10:1, preferably 2:1 to 6:1. As a matter of convenience, the cocrystalline catalyst component and the second catalyst component are each dispersed in an inert organic diluent which can also serve as the polymerization medium. The catalyst components can also be mixed in situ, i.e. by placing each separate catalyst component in the polymerization reactor, e.g. a rocking bomb, which contains an inert organic diluent, injecting the desirable monomer, and allowing the catalyst components to be admixed as the polymerization reaction proceeds.

Suitable examples of the inert organic diluent, which should be a liquid at the operating conditions of the polymerization reaction, include aliphatic hydrocarbons such as pentane, hexane, isooctane, and the like; cycloaliphatic hydrocarbons such as cyclopentane, cyclohexane, decahydronaphthalene, and the like; halogenated hydrocarbons such as trifluoromethane, dichloroethane, and the like; aromatic hydrocarbons such as benzene, toluene, ethylbenzene, xylene, tetrahydronaphthalene, and the like; halogenated aromatic hydrocarbons, e.g. mono- or di-chlorobenzenes, and the like. Although the concentrations of the catalyst components are not critical, sufficient amounts of the diluent are employed such that the concentration of each component is normally in the range of 0.1 to 10 g./l., preferably 0.5 to 5 g./l.

In preparing and using catalysts according to this invention, all steps should be carried out in the absence of oxygen, moisture, carbon dioxide or other harmful impurities. This may be readily accomplished by blanketing all the raw materials, i.e. the catalyst components, monomers, inert diluents, etc. with an inert gas such as dry nitrogen or argon. Electron donors such as amines, mercaptans, ketones, aldehydes, etc. are generally poisonous to the catalyst system and it is generally desirable that the monomer contain less than about 200 p.p.m. and the diluent less than about 50 p.p.m. by weight of these impurities. Preferably all materials are purified, e.g. by drying, distillation, etc. prior to their use.

In practicing another embodiment of the instant invention, after the catalyst has been prepared as stated hereinabove, it is placed in the polymerization reactor and an alpha olefin of the type described hereinbelow is injected into the reactor. If no diluent has been employed in the catalyst preparation, it is desirable to add sufficient amounts (i.e. such that the concentration of the catalyst in the diluent ranges from about 0.1 g./l. to about 10 g./l.) of the diluent of the nature indicated for catalyst preparation prior to injection of the monomer (i.e. the alpha olefin to be described below). The monomer concentration in the diluent is not critical and concentrations of 0.1 to 100%, preferably 2 to 50% may be employed.

The polymerization reaction is then carried out at a temperature ranging from about $-50°$ C. to about 250° C., preferably 20° C. to 100° C. The monomer is allowed to remain in contact for a period of time ranging from about 0.1 to about 30 hours, preferably 0.3 to 6 hours, during which time more diluent may be added so as to maintain the total pressure at the desired level which may be as low as atmospheric and as high as 5000 p.s.i.g. but preferably is in the range of 50 to 1000 p.s.i.g.

The amount of monomer added will, of course, be determined by catalyst activity, reaction time, diluent volume, desired monomer conversion, etc. but may advantageously be in the range of about 10 g. to about 1000 g. monomer per g. total catalyst when the reaction is carried out batchwise. Normally it is desirable for good operability to limit the concentration of polymer in the diluent to less than 20 weight percent. If necessary, the polymer concentration may be maintained at or below this level by the addition of more diluent during the polymerization reaction.

At the end of the reaction, the solid polymer is precipitated and deashed with the aid of about 0.2 to 20 volumes of a $C_1$–$C_6$ alcohol such as methyl alcohol, ethyl alcohol, isopropyl alcohol, n-butyl alcohol, and the like. The precipitated product is then filtered and washed with more alcohol and may then be finished by the addition of suitable stabilizers and inhibitors followed by drying according to methods now well known in the polymer field.

The polymerization reaction may, of course, also be carried out as a continuous operation in which case the catalyst components, preferably mixed with sufficient diluent, may be continuously added to the reactor either separately or previously combined. Separate streams of additional diluent may also be continuously added so as to maintain a suitable polymer concentration in the diluent, achieve desirable monomer conversion, and obtain a high catalyst efficiency, i.e. in the range of about 5 g. to 500 g. polymer per g. catalyst.

Thus, alpha olefins containing 2–10 carbon atoms inclusive, either singly or in admixture may be polymerized or copolymerized in the presence of the catalyst of this invention to yield normally solid polymeric products; block copolymerizations are especially facilitated by the use of the catalyst of the instant invention.

Suitable examples of alpha olefins include straight chain monoolefins such as ethylene, propylene, butene-1, hexene-1, octene-1, decene-1, and the like; branched chain monoolefins such as 3-methyl-1-butene, 3-methyl-1-pentene, 4-methyl-1-pentene, 6-methyl-1-heptene, and the like; diolefins such as butadiene, isoprene, hexadiene-1,5, and the like; styrene, α-methyl styrene, and the like; polar monomers such as acrylonitrile, vinyl chloride, ketenes, olefin oxides, and the like.

The polymers which can be prepared by polymerizing or copolymerizing monomers of the type indicated above with the catalysts of this invention have a molecular weight in the range of about 50,000 to about 5,000,000, thus covering all important useful molecular weight ranges for solid polymers.

This invention and its advantages will be better understood by reference to the folowing examples:

EXAMPLES 1–6

Into a 0.1 gallon stainless steel jar (contained in a glove box with a dry nitrogen atmosphere) filled with ⅓ of its volume with ⅜" stainless steel balls were charged 8.9 g. (0.10 mole) $MnO_2$ (activated, 1–100 micron average diameter particle size) and 20 g. (0.15 mole( anhydrous $AlCl_3$. The jar was sealed and the contents ball-milled for 60 hours. After this time, the jar was opened carefully to vent off chlorine gas. The recovered solids amount to 84.2 weight percent of the initial charge. To 50 ml. xylene was added 0.26 g. of the ball-milled $AlCl_3$-$MnO_2$ and the remainder of the charge was stored under nitrogen for future use. Two ml. of a 1.0 molar $(C_2H_5)_3Al$ solution in xylene was then admixed with the xylene slurry. The mixed catalyst slurry was placed in a 280 ml. stainless steel rocking bomb and 75 g. of ethylene was pressured into the bomb. The bomb was then heated to 80° C. and allowed to rock for 4 hours at that temperature. At the end of the 4 hour period, the bomb was allowed to cool to room temperature, excess ethylene was vented and the polymer was precipitated from the reaction mixture by the addition of two volumes of methanol and the precipitated polymer filtered. The filtered polymer was given a second methanol wash, filtered again, and vacuum dried.

The details of the catalyst preparation, polymerization reaction, and catalyst efficiency are given in Table I. Included also in Table I are Example 2 and 3 which were identical to that described above except that in Example 2 the ball-milled $AlCl_3$-$MnO_2$ mixture was treated in a vacuum oven at 138° C. for 7.5 hours under 1–2 mm. Hg pressure prior to the subsequent adddition of $(C_2H_5)_3Al$. In a similar fashion, the catalyst employed in Example 3 was prepared by treating the ball-milled $AlCl_3$-$MnO_2$ mixture in a vacuum oven at room temperature (about 23° C.) for 7.5 hours prior to the subsequent addition of $(C_2H_5)_3Al$. Examples 4–6 differ from Examples 1–3 in that different, i.e. other than 1.5/1, molar ratios of $AlCl_3/MnO_2$ are employed.

*Table I.—Polymerizations using ball-milled $AlCl_3/MnO_2$*

[280 ml. stainless steel rocking bomb, 50 ml. xylene diluent, 80° C., 4 hours]

| Example | 1 | 2 | 3 | 4 | 5 | 6 |
|---|---|---|---|---|---|---|
| $AlCl_3$, millimoles | 1.5 | 1.5 | 1.5 | 2.0 | 2.0 | 1.0 |
| $AlCl_3/MnO_2$, mola ratio | 1.5/1 | 1.5/1 | 1.5/1 | 2.0/1 | 2.0/1 | 1.0/1 |
| Ball-Milling Time, Hours | 60 | 60 | 60 | 60 | 60 | 83 |
| Vacuum Treatment of $AlCl_3/MnO_2$ at 1–2 mm. Hg | No | Yes | Yes | No | Yes | No |
| Temp., ° C | | 138 | 23 | | 23 | |
| Time, hours | | 7.6 | 7.7 | | 6.0 | |
| Second Catalyst Component | 2 mmol $(C_2H_5)_3Al$ | | | | | |
| Monomer | 75 g. Ethylene | | | | | |
| Catalyst Efficiency (g. solid polymer/g. $AlCl_3$-$MnO_2$) | 53.6 | 15.8 | 86.2 | 13.1 | 16.3 | 8.6 |

As can be seen from Table I, good yields of solid polymer were obtained in each example. However, a comparison of Examples 1 and 3 indicates that vacuum removal of any free halogen from the ball-milled $AlCl_3/MnO_2$ prior to addition of the second catalyst component increases the catalyst efficiency. Example 2 indicates that the vacuum treatment of the ball-milled $AlCl_3/MnO_2$ should be preferably conducted at or below room temperature since $AlCl_3$, if not strongly combined in the cocrystalline form, will sublime away at a temperature of 138° C. and a pressure of 1–2 mm. Hg. The polyethylene which was obtained in Example 3 had a molecular weight of 880,000 as calculated by the use of the Chiang equation (J. Polymer Sci., 36, 91 (1959)) from viscosity measurements made in decalin at 135° C., and a crystalline melting point of 134° C., which is indicative of a plastic-grade, highly linear, polymeric product.

A comparison of Examples 4 and 5 adds support to the conclusion that removal of any free halogen from the ball-milled $AlCl_3$-$MnO_2$, prior to addition of the second catalyst component, increases the catalyst efficiency.

A comparison of Examples 1, 4 and 6 indicates that the molar ratio of 1.5/1 as regards the ball-milled $AlCl_3/MnO_2$ affords the greatest catalyst efficiency under similar reaction conditions. A comparison of Examples 3 and 5 also indicates that a molar ratio of 1.5/1 for $AlCl_3/MnO_2$ is particularly preferred.

EXAMPLE 7

Into a clean dry mortar (contained in a glove box under dry nitrogen atmosphere) was placed 5.32 g. (0.04 mole (anhydrous $AlCl_3$ and 1.74 g. (0.02 mole) activated $MnO_2$. The mixture was ground by hand for one-half hour after which it was placed in a clean, dry test tube and heated under nitrogen for 30 minutes at 190° C. After cooling, the hand-mixed $AlCl_3$-$MnO_2$ was employed in the polymerization of ethylene as described in Example 1. The details of the catalyst prepartion, polymerization reaction, and catalyst efficiency are given in Table II. Included also in Table II is Example 4 (previously set forth in Table I) for the purposes of comparison.

*Table II.—Ball-milled $AlCl_3/MnO_2$ versus hand-mixed $AlCl_3/MnO_2$*

[280 ml. Stainless steel rocking bomb, 50 ml. xylene diluent, 80° C., 4 hours]

| Example | 4 | 7 |
|---|---|---|
| $AlCl_3$, millimoles | 2.0 | 2.0 |
| $AlCl_3/MnO_2$, molar ratio | 2.0/1 | 2.0/1 |
| Ball-Milling Time, Hours | 60 | No |
| Hand Mixing and Heating | No | Yes |
| Temp., ° C | | 190 |
| Time, Hours | | 0.5 |
| Second Catalyst Component | (¹) | Al |
| Monomer | 75 g. Ethylene | |
| Catalyst Efficiency, g. solid polymer/g. $AlCl_3$-$MnO_2$ | 13.1 | 2.9 |

¹ 2 mmol. $(C_2H_5)_3$.

Comparison of Examples 4 and 7 indicates that the ball-milled $AlCl_3$-$MnO_2$ exhibited a greater than 4-fold increase in catalyst efficiency over the hand-mixed AlCl$_3$-MnO$_2$, thus illustrating the definite superiority of ball-milling as a method of preparing the cocrystalline catalysts of this invention.

EXAMPLES 8–14

Following the procedures set forth in Examples 1 and 7 hereinabove, polyethylene was polymerized with a variety of catalyst. The details of the catalyst preparation, polymerization reaction, and catalyst efficiency are given in Table III.

*Table III.—Polymerization of ethylene*

[280 ml. stainless steel rocking bombs, 75 g. ethylene, 50 ml. xylene diluent, 80° C., 4 hours]

| Example | 8 | 9 | 10 | 11 | 12 | 13 | 14 |
|---|---|---|---|---|---|---|---|
| MO$_c$X$_d$ Compound, millimole | [1] 1 | [1] 1 | [1] 1 | [1] 1 | [2] 1 | [3] 1 | [2] 1 |
| MO$_c$X$_d$/MnO$_2$, molar ratio | 1/1 | 1/1 | 1/1 | 1/1 | 1/1 | 1/1 | 1/1 |
| Ball Milling Time, Hours | 63.5 | No | 83 | 83 | No | No | No |
| Vacuum Treatment | No | No | No | No | No | No | No |
| Hand Mixing and Heating | No | Yes | No | No | Yes | Yes | Yes |
| Temp., °C | | 72–100 | | | 75–110 | 75–110 | 75–110 |
| Time, hours | | 1.0 | | | 1.0 | 1.0 | 1.0 |
| Second Catalyst Component, millimoles | [4] 2 | [4] 2 | [5] 2 | [6] 2 | [4] 2 | [5] 2 | [5] 2 |
| Catalyst Efficiency (g. solid polymer/g. MO$_c$X$_d$-MnO$_2$) | 33.2 | 11.9 | 7.0 | 4.9 | 11.2 | 6.3 | 3.6 |

[1] AlBr$_3$. [2] PCl$_5$. [3] POCl$_3$. [4] (C$_2$H$_5$)$_3$Al. [5] Al(C$_2$H$_5$)$_2$Cl. [6] AlC$_2$H$_5$Cl$_2$.

Table III indicates that various catalysts, i.e. other than those described in Tables I and II, may be used to prepare solid polymeric products. A comparison of Examples 8 and 9 further illustrates the superiority in catalyst efficiency when the first catalyst component is ball-milled rather than hand-mixed.

EXAMPLE 15.—POLYMERIZATION OF PROPYLENE

Into a 280 ml. stainless steel bomb were charged 50 ml. anhydrous xylene, 2.0 ml. of a 1.0 molar solution of (C$_2$H$_5$)$_3$Al in xylene, and 0.185 g. of an AlCl$_3$-MnO$_2$ mixture. Said AlCl$_3$-MnO$_2$ mixture had been previously prepared by hand-grinding equimolar amounts of AlCl$_3$ and MnO$_2$ and then heating the mixture under nitrogen atmosphere for 30 minutes at 190° C. The bomb was sealed and 75 g. of propylene was injected into the bomb. The bomb was then heated, with rocking at 80° C. for 4 hours. The bomb was cooled to room temperature, the unreacted propylene vented, and the contents poured into two volumes methanol. After further methanol washing, followed by vacuum drying, 0.7 g. solid polypropylene was obtained. The polypropylene had a crystalline melting point of 158° C., indicative of a highly stereoregular structure.

EXAMPLE 16.—POLYMERIZATION OF BUTADIENE

Into a one-quart soda king bottle were charged 400 ml. anhydrous xylene, 2.0 ml. of a 1.0 molar solution of (C$_2$H$_5$)$_3$Al in xylene, 0.26 g. of the AlCl$_3$-MnO$_2$ mixture of Example 3, and 75 g. butadiene. The bottle was sealed and heated at 60° C. for 24 hours. One-half gram solid, white polybutadiene was obtained.

EXAMPLE 17

Into a one-quart soda king bottle was charged 50 ml. anhydrous xylene, 2.0 ml. of a 1.0 molar solution of (C$_2$H$_5$)$_3$Al in xylene, 0.26 g. of the AlCl$_3$-MnO$_2$ mixture of Example 3, and 75 g. of freshly distilled styrene. The bottle was sealed and heated at 60° C. for 24 hours. Four grams solid white polystyrene, with a crystalline melting point of 163° C., were obtained.

Although the catalysts in the examples were prepared batchwise, it is obviously within the scope of this invention to prepare catalysts continuously or batchwise and to utilize either preparation in continuous or batch polymerizations and copolymerizations.

The advantages of this invention will be apparent to the skilled in the art. Novel catalyst systems of high activity and stereospecificity are made available for polymerizing and copolymerizing a wide range of alpha olefins. The polymers thus produced have superior characteristics as regards molecular weight, crystallinity, and mechanical properties.

It is to be understood that this invention is not limited to the specific examples which have been offered merely as illustrations and that modifications may be made without departing from the spirit of the invention.

What is claimed is:

1. A process for preparing a polymerization catalyst comprising the steps of (a) intimately mixing an inorganic metallic compound, wherein the cationic moiety is a metal of Group VII–$b$ of the Periodic System and the anionic moiety is an element of Group VI–$a$ of the Periodic System, with a compound having the general formula MO$_c$X$_d$, wherein M is a metal of Groups III–$a$ or V–$a$ of the Periodic System, O is oxygen, $c$ is an integer of zero to one inclusive, X is a halogen with an atomic number of at least 17, $d$ is an integer of one to five inclusive, and the sum of $c$ and $d$ is equal to the valence of the metal M, thereby forming a cocrystalline solid and (b) contacting the cocrystalline solid with an organometal compound having the general formula R$_n$M'X$_y$, wherein R is a monovalent hydrocarbon radical, M' is a metal of Groups I–$a$, II–$a$, II–$b$, or III–$a$ of the Periodic System, X is a halogen with an atomic number of at least 17, $n$ is an integer of one to threee inclusive, $y$ is an integer of zero to two inclusive, and the sum of $n$ and $y$ is equal to the valence of the metal M'.

2. The process of claim 1 wherein the intimate mixing is accomplished by dry ball milling.

3. The process of claim 2 wherein any free halogen adsorbed on the surface of the cocrystalline solid is removed under reduced pressure at about room temperature prior to contacting said solid with the organometal compound.

4. A polymerization catalyst which is a mixture of (a) a cocrystalline solid comprising an inorganic metallic compound, wherein the metallic moiety is a metal of Group VII–$b$ of the Periodic System and the anionic moiety is an element of Group VI–$a$ of the Periodic System, and a compound having the general formula MO$_c$X$_d$, wherein M is a metal of Groups III–$a$ or V–$a$ of the Periodic System, O is oxygen, $c$ is an integer of zero to one inclusive, X is a halogen with an atomic number of at least 17, $d$ is an integer of one to five inclusive, and the sum of $c$ and $d$ is equal to the valence of the metal M and (b) an organometal compound having the general formula R$_n$M'X$_y$, wherein R is a monovalent hydrocarbon radical, M' is a metal of Groups I–$a$, II–$a$, II–$b$ or III–$a$ of the Periodic System, X is a halogen with an atomic number of at least 17, $n$ is an integer of one to three inclusive, $y$ is an integer of zero to two inclusive, and the sum of $n$ and $y$ is equal to the valence of the metal M'.

5. A polymerization catalyst which is a mixture of (a) a cocrystalline solid comprising an oxide of manganese and a halide of phosphorus and (b) a lower alkyl aluminum compound.

6. The catalyst of claim 5 wherein the halide of phosphorus is an oxyhalide of phosphorus.

7. A polymerization catalyst which is a mixture of (a) a cocrystalline solid comprising an oxide of manganese and a halide of aluminum and (b) a lower alkyl aluminum compound.

8. A polymerization catalyst consisting essentially of a mixture of a cocrystalline solid of $MnO_2$ and $PCl_5$, the molar ratio of $PCl_5$ to $MnO_2$ being in the range of 0.2:1 to 4:1, and $Al(C_2H_5)_3$, the molar ratio of $Al(C_2H_5)_3$ to $MnO_2$ being in the range of 0.1:1 to 10:1.

9. A polymerization catalyst consisting essentially of a mixture of a cocrystalline solid of $MnO_2$ and $POCl_3$, the molar ratio of $POCl_3$ to $MnO_2$ being in the range of 0.2:1 to 4:1, and $Al(C_2H_5)_3$, the molar ratio of $Al(C_2H_5)_3$ to $MnO_2$ being in the range of 0.1:1 to 10:1.

10. A polymerization catalyst consisting essentially of a mixture of a cocrystalline solid of $MnO_2$ and $AlCl_3$, the molar ratio of $AlCl_3$ to $MnO_2$ being in the range of 0.2:1 to 4.1, and $Al(C_2H)_3$, the molar ratio of $Al(C_2H_5)_3$ to $MnO_2$ being in the range of 0.1.1 to 10:1.

11. A polymerization catalyst consisting essentially of a mixture of a cocrystalline solid of $MnO_2$ and $AlBr_3$, the molar ratio of $AlBr_3$ to $MnO_2$ being in the range of 0.2:1 to 4:1, and $Al(C_2H)_3$, the molar ratio of $Al(C_2H_5)_3$ to $MnO_2$ being in the range of 0.1:1 to 10:1.

12. A polymerization process for the production of a normally solid polymer which comprises the steps of (a) contacting an alpha olefin having 2–10 carbon atoms with the catalyst of claim 4 and (b) recovering a normally solid polymer of said olefin.

13. A polymerization process for the production of a normally solid polymer which comprises the steps of (a) contacting an alpha olefin having 2–10 carbon atoms with the catalyst of claim 8 at a temperature between about 20° C. and about 200° C. and a pressure between 50 p.s.i.g. and about 1000 p.s.i.g and (b) recovering a normally solid polymer of said olefin.

14. A polymerization process for the production of a normally solid polymer which comprises the steps of (a) contacting an alpha olefin having 2–10 carbon atoms with the catalyst of claim 9 at a temperature between about 20° C. and about 200° C. and a pressure between 50 p.s.i.g. and about 1000 p.s.i.g and (b) recovering a normally solid polymer of said olefin.

15. A polymerization process for the production of a normally solid polymer which comprises the steps of (a) contacting an alpha olefin having 2–10 carbon atoms with the catalyst of claim 10 at a temperature between about 20° C. and about 200° C. and a pressure between 50 p.s.i.g. and about 1000 p.s.i.g and (b) recovering a normally solid polymer of said olefin.

16. A polymerization process for the production of a normally solid polymer which comprises the steps of (a) contacting an alpha olefin having 2–10 carbon atoms with the catalyst of claim 11 at a temperature between about 20° C. and about 200° C. and a pressure between 50 p.s.i.g. and about 1000 p.s.i.g and (b) recovering a normally solid polymer of said olefin.

No references cited.

JOSEPH L. SCHOFER, *Primary Examiner.*